United States Patent

[11] 3,621,204

| [72] | Inventors | Manfred Neidhardt<br>Ranzel near Troisdorf;<br>Joseph Schneider, Luisdorf near Troisdorf,<br>both of Germany |
|------|-----------|---|
| [21] | Appl. No. | 33,054 |
| [22] | Filed | Apr. 29, 1970 |
| [45] | Patented | Nov. 16, 1971 |
| [73] | Assignee | Dynamit Nobel Aktiengesellschaft |
| [32] | Priority | Apr. 29, 1969 |
| [33] | | Germany |
| [31] | | P 19 21 789.1 |

[54] ELECTRICAL HEATING ELEMENT WITH FUSED MAGNESIA INSULATION
6 Claims, No Drawings

[52] U.S. Cl.............................................. 219/553,
174/118, 219/544, 219/548, 219/552, 252/63.2,
252/63.5, 338/238

[51] Int. Cl....................................................... H05b 3/18,
H01c 7/02, H01b 3/10

[50] Field of Search............................................. 252/63.2,
63.5; 338/238-242; 219/523, 530, 540, 544, 548,
552, 553; 174/118

[56] References Cited
UNITED STATES PATENTS

| 2,285,952 | 6/1942 | Vogel et al.................... | 174/102 |
| 2,669,636 | 2/1954 | Rawles......................... | 252/63.2 |
| 3,477,058 | 11/1969 | Vedder et al. ................ | 338/238 |
| 3,488,475 | 1/1970 | Grönwoldt .................... | 219/365 |

*Primary Examiner*—John T. Goolkasian
*Assistant Examiner*—Robert A. Dawson
*Attorney*—Burgess, Dinklage & Sprung

ABSTRACT: An electrical heating element comprising a resistance wire in a metal tubular jacket insulated therefrom with a fused granular magnesia is improved from the standpoint of electrical leakage or loss by admixing with the magnesia a small amount of a sintered and finely divided magnesium silicate or magnesium oxide having a particle size substantially completely under 10 microns.

ELECTRICAL HEATING ELEMENT WITH FUSED MAGNESIA INSULATION

PREAMBLE

Fused, granulated magnesia is used as an electrical insulating material between electric heating wires and their tubular jackets in electrical tubular heating elements used, for example, in household appliance industry. The chemical composition of the magnesia runs approximately within the following limits:

| | Weight Percent |
|---|---|
| MgO | ** 94–98 |
| SiO$_2$ | 1.0–3.5 |
| CaO | 0.5–2.0 |
| Al$_2$O$_3$ | 0.02–0.25 |
| Fe$_2$O$_3$ | 0.01–0.10 |
| NiO | 0.01–0.03 |

Also present in some cases are traces of SO$_3$, Cl, B$_2$O$_3$, TiO$_2$, Na$_2$O or K$_2$O.

The commercial granular mixtures differ but slightly in their grain size distribution, which as a rule is between 0.01 and 0.37 mm., by far the greater percentage being larger than about 0.12 mm. The electrical resistance of the insulating materials made from such mixtures may differ greatly. This is particularly apparent when the material is exposed to temperatures higher than about 800° to 900° C. The reasons for this are not entirely clear. The leakage currents, which are inversely proportional to the resistances, vary between about 6ma. and about 40 ma., in spite of similar chemical composition, at a specific surface load of, e.g., 10 watts, under the test conditions to be described below. What is desired, however, is the lowest possible electrical conductivity, particularly at high temperatures or high specific electrical loads.

THE INVENTION

The present invention is a process for the preparation of tube packing materials of elevated electrical resistance from granular fused magnesium oxide for electrical heating elements. Sintered magnesium silicates, magnesium oxide, or mixtures thereof, whose grains consist virtually entirely or predominantly of individual crystals smaller than 10 microns, are added to the magnesium oxide before it is loaded into the tube. The granular fused magnesium oxide can have a blocky cubic form, but it can advantageously also be spherical.

The magnesium silicate to be added is prepared by sintering a synthetic or mineral product, such as talc, steatite, enstatite or the like, at above 1,100° C., preferably at about 1,350° C., and then crushing the sintered blocks to a grain size of less than 0.37 and preferably less than 0.1 mm. The amount thereof added is 0.05 to 6 weight percent, preferably 2 weight percent.

The magnesium oxide to be added is prepared from magnesia of a grain size under 5 microns (magnesia usta) by sintering at 1,500°–2,000° C., preferably at about 1,700° C., followed by crushing the sintered block to a grain size under 0.37 and preferably under 0.1 mm. The quantity added amounts to 3 to 20 weight percent, preferably 10 weight percent, the individual grains having a grapelike appearance when seen under the microscope.

Experiments have shown that the electrical conductivity in the tubular heating element can be reduced considerably by the incorporation, according to the invention, of additives into magnesia insulation material. The additives appear to act as lubricants in the compression process. Parallel to the reduced grain destruction in the compression process, an elevated thermal conductivity is achieved by a more compact interfitting between the grains in the mass. This increased thermal conductivity brings about a lower temperature gradient from the heating coil to the tubular jacket. The result is a lower cross-sectional temperature for the same surface temperature and, on account of the relationship between temperature and electrical conductivity, the electrical loss is lower.

The additives must be finely crystalline according to this invention. In the crystal structure of an individual grain the greatest possible number of crystallites must be united in a relatively loose manner to form larger crystal aggregates, so that the crystallites or crystal aggregates preformed in the grain can easily slide against one another.

Ordinary mineral lubricants, such as talc or steatite, do not meet these requirements, even when they have been completely dehydrated by roasting. Mica is not suitable because of its extremely high inherent conductivity at high specific electrical loads.

EXAMPLES

The leakage currents given in the following tables were measured in tubular heating elements, which constitute a criterion for the electrical insulating quality of the magnesia, and were compared to those of standard commercial products.

The measurement of the leakage currents, which are inversely proportional to the resistances, was performed in highgrade steel tubes similar to those used in electrical appliance design. The tubes had the following dimensions:

Length: 500 mm.
Diameter: 10 mm. (prior to compression)
Wall thickness: 0.75 mm.

After filling and sealing, the tubes were reduced to a diameter of 8.2 mm. e.g., by means of ring hammers. The heating coils had a diameter of 3 mm. and a wire diameter of 0.3 mm. The test voltage between the heating coil and the tube material was 500 v. The heating voltage applied was between 170 and 240 v., on the specific load.

EXAMPLES 1–5

Sintered magnesium silicate (enstatite), crushed to a grain size smaller than 0.10 mm., was added in quantities of 2 weight percent to samples of commercial electromagnesia of various qualities.

| Specific Load | 7 | 8 | 9 | 10 | Watts/cm.$^2$ |
|---|---|---|---|---|---|
| a. Without additive | 1.70 | 3.55 | 7.0 | 16.2 | mA |
| With additive | 1.07 | 1.72 | 3.65 | 7.4 | mA |
| b. Without additive | 2.35 | 4.65 | 10.2 | 19.4 | mA |
| With additive | 1.12 | 1.88 | 3.30 | 7.1 | mA |
| c. Without additive | 1.63 | 4.30 | 11.0 | 34.9 | mA |
| With additive | 1.28 | 2.75 | 6.3 | 13.3 | mA |
| d. Without additive | 1.16 | 2.40 | 5.3 | 14.6 | mA |
| With additive | 0.70 | 1.19 | 2.55 | 5.9 | mA |
| e. Without additive | 1.85 | 1.90 | 2.65 | 8.25 | mA |
| With additive | 0.90 | 1.0 | 1.10 | 4.2 | mA |

EXAMPLE 6

A sintered magnesium oxide prepared according to the above description and crushed to a grain size smaller than 0.37 mm. was added to an electromagnesia in a quantity of 10 weight percent.

| Specific Load | 7 | 8 | 9 | 10 | Watts/cm.$^2$ |
|---|---|---|---|---|---|
| Without additive | 3.20 | 5.1 | 8.4 | 19.0 | ma. |
| With additive | 2.94 | 4.55 | 6.6 | 13.4 | ma. |

We claim:

1. In the preparation of an electrical heating element comprising a resistance wire in a tubular jacket with insulation therebetween consisting essentially of a fused granular magnesium oxide, the improvement comprising admixing with said magnesium oxide prior to incorporation into said heating element a finely divided sintered material selected from the group consisting of magnesium silicate and magnesium oxide, the grains of which are at least predominately composed of individual grains having a size less than 10 microns.

2. The process of claim 1 wherein said material is a magnesium silicate prepared by sintering the same above 1,100° C. followed by the crushing of the resulting sintered block to a grain size under 0.37 mm., and the quantity added being in the range of 0.05 to 6 weight percent.

3. The process of claim 1 wherein said material is a magnesium oxide prepared from magnesia of a grain size under 5 microns by sintering at 1,500°–2,000° C., followed by crushing of the resulting sintered block to a grain size under 0.37 mm. and the quantity added being in the range of 3 to 20 weight percent.

4. A granulated magnesia composition adapted as insulation for electrical heating elements, consisting essentially of magnesium oxide powder and added to said powder a pulverized sintered magnesium silicate or magnesium oxide, the grains of which consist virtually entirely of individual crystals under 10 microns in size.

5. The magnesia composition of claim 4 wherein when the sintered material added is magnesium silicate the amount is 0.05 to 6 weight percent and when it is magnesium oxide, the amount is 3 to 20 weight percent.

6. In an electrical heating element comprising a resistance wire in a conductive tubular jacket with a fused granular insulation therebetween, the improvement comprising using as said insulation a mixture of
   1. largely a granular magnesium oxide, and
   2. in the range of 0.05 to 20 weight percent of sintered and finely divided magnesium silicate or magnesium oxide, the grains thereof predominately having a size of less than 10 microns.

* * * * *

PO-1050
(5/69)

UNITED STATES PATENT OFFICE
CERTIFICATE OF CORRECTION

Patent No. 3621204    Dated November 16, 1971

Inventor(s) Manfred Neidhardt et al

It is certified that error appears in the above-identified patent and that said Letters Patent are hereby corrected as shown below:

<u>Col. 1, second column of Table</u>

"1 0- 3 5" should be -- 1.0-3.5 --;

"0 5-2 0" should be -- 0.5-2.0 --;

"0 02-0 25" should be -- 0.02-0.25 --;

"0 01- 0 10" should be -- 0.01-0.10 --;

"0 01-0 03" should be -- 0.01-0.03 --.

<u>Col. 2, Examples 1 - 5</u> line 43 under col. 10, "16.2" should be -- 16.5 --.

<u>Col. 2, lines 61 and 62</u>

"ma" should be -- mA --.

Signed and sealed this 20th day of June 1972.

(SEAL)
Attest:

EDWARD M. FLETCHER, JR.           ROBERT GOTTSCHALK
Attesting Officer                 Commissioner of Patents